United States Patent Office 3,546,743
Patented Dec. 15, 1970

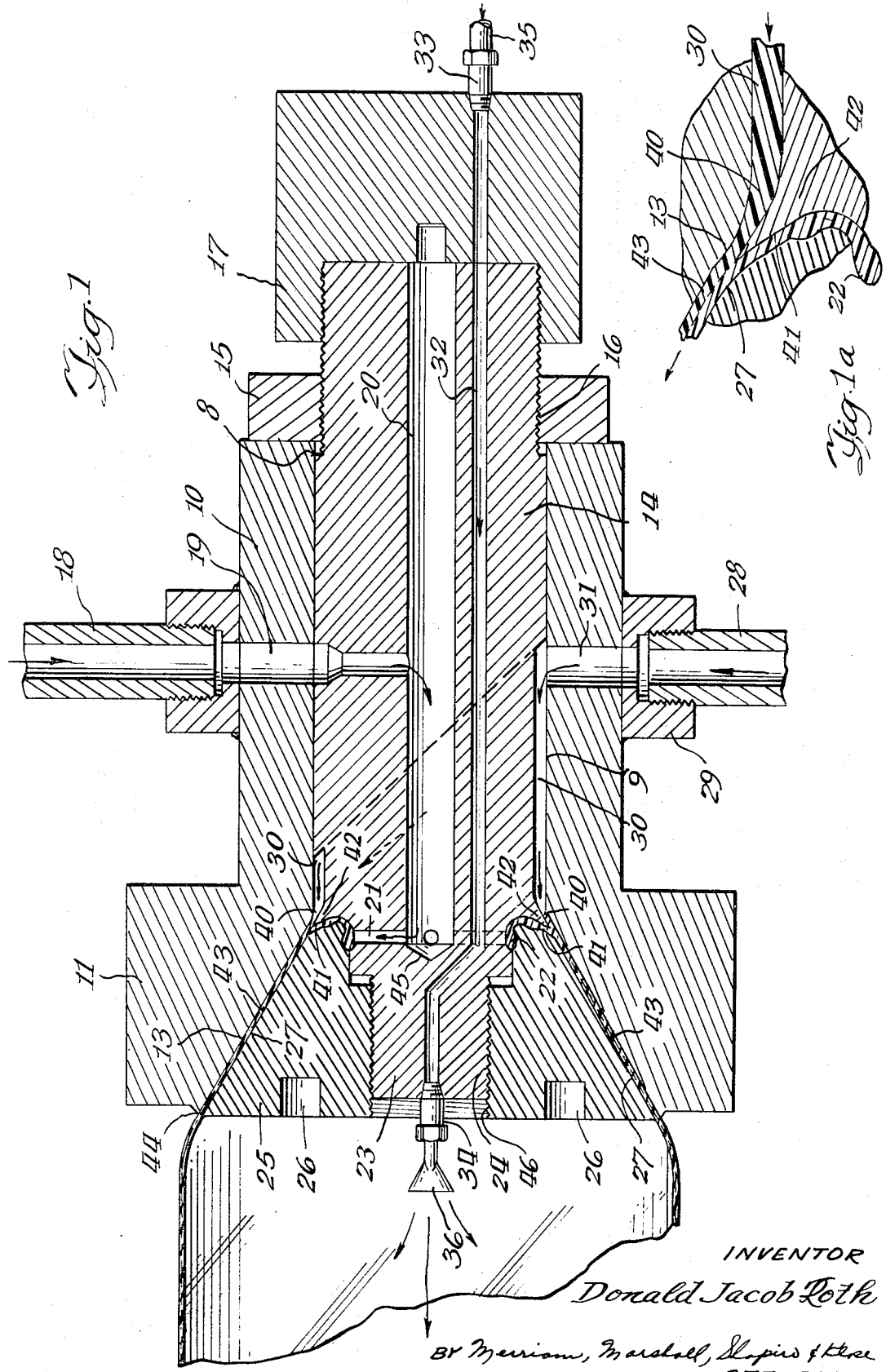

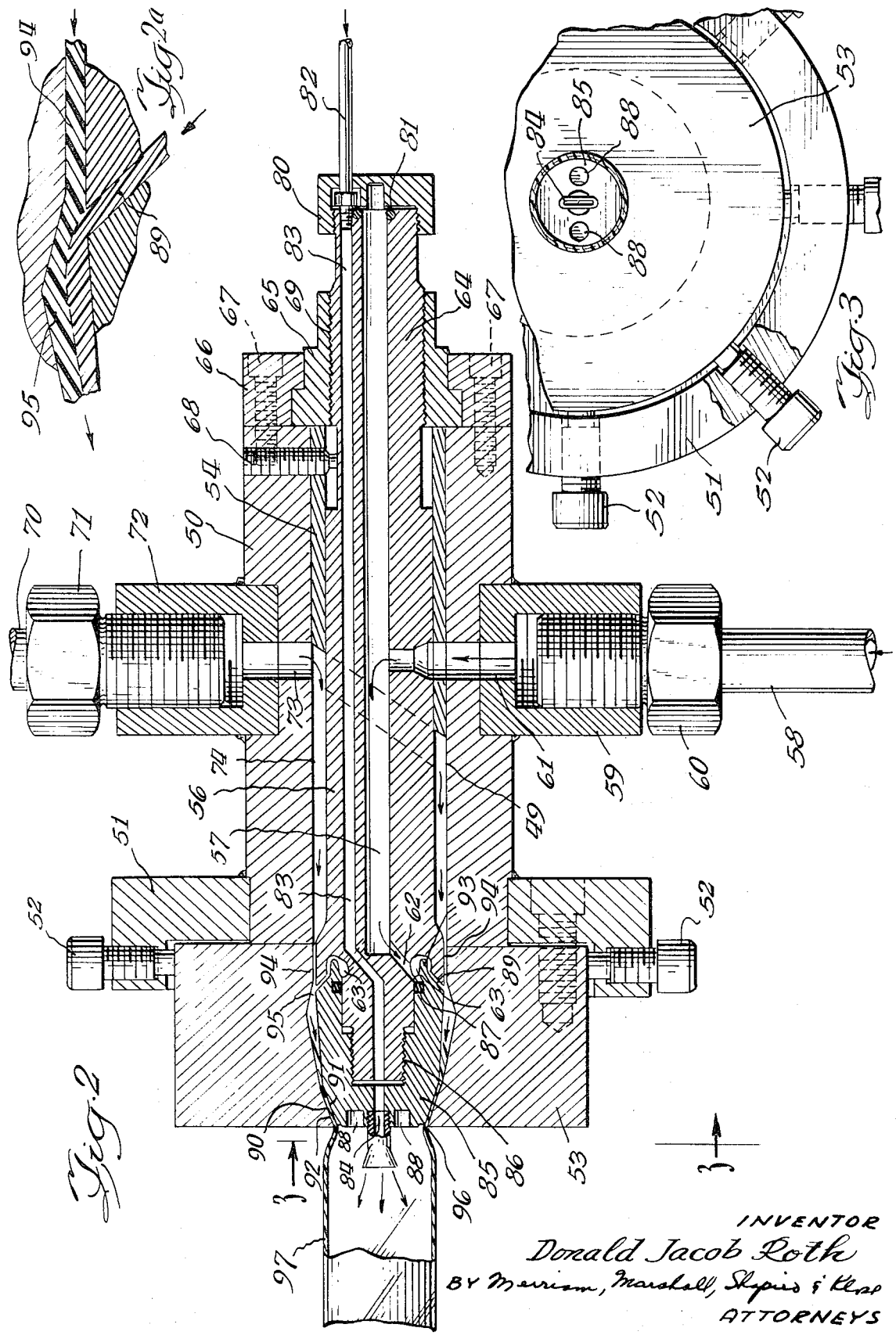

3,546,743
DIE FOR EXTRUDING LAMINATED PLASTIC TUBE
Donald Jacob Roth, Mankato, Minn., assignor by mesne assignments, to Northern Petrochemical Company, Omaha, Nebr., a corporation of Delaware
Filed Apr. 26, 1968, Ser. No. 724,405
Int. Cl. B29d 23/04
U.S. Cl. 18—14                                                11 Claims

ABSTRACT OF THE DISCLOSURE

Disclosed is a die for extruding a multiply laminated tube of plastic material. The die has means to adjust the thickness of each ply as it is formed and before containing the other ply. In addition, the die has means for pressing the plies together to facilitate bonding and to control the thickness of the laminated tubular product.

---

This invention relates to the production of tubular products made up of two or more layers of plastic material. More particularly, the invention is concerned with extrusion dies for making laminated tubes and films of plastic material.

In the production of tubular products of plastic a die is often used having a circular orifice through which molten plastic is extruded. Air is often forced through the center of the die to maintain the extruded plastic tube in a tubular bubble shape until it cools. The tubular product is then passed between pinch rolls to flatten it into a sheet of double thickness. It can then be cut to different lengths for making bags and the like or it can be split axially to make sheet or film material. The extruded tubular material can also be used, if of sufficient thickness and the like, for blow molding into bottles, containers and the like such as shown in U.S. Patent 3,082,484, or it can be used as a hose or pipe.

Generally the tubular product and resulting sheet or film produced therefrom is made of a single plastic, such as polyethylene or some other plastic which can be suitably extruded. Products made of a single plastic, however, are not suitable for all purposes. This is because the plastic may be unsuitable for use with many liquids or chemicals, for holding certain liquids or solids because of high vapor or gas permeability or because of an inability to extrude the product without formation of pinholes. It has thus become advisable for many uses to produce tubular products of laminated plastic layers, with each layer being the same or a different plastic material.

The prior art shows a number of coaxial extrusion dies which can be used for making laminated tubular products such as hoses and other plastic tubing of a thinner nature. Some such U.S. Patents are 3,223,761; 2,957,201; 2,501,690; 3,222,721; 2,574,555; and 2,809,393. In general, the coaxial extrusion dies as disclosed in such patents extrude a tubular layer around an inner tubular layer to form a laminated product. Some of these use the described tubular bubble method for forming laminated sheeting or film while other of the patents show formation of coaxial extruded laminated tubular products such as hoses and other thick walled products which do not employ the bubble method.

Although existing coaxial extrusion dies can be used for making laminated tubular products and laminated film, it would be advantageous and useful to have available dies with greater flexibility so that the thickness of the laminates as well as of the laminated product can be adjusted according to the qualities of the plastics being used in forming the product and with regard to the characteristics sought in the resulting product. It is thus a major purpose of the subject invention to provide an improved coaxial extrusion die for forming laminated tubular plastic products, as well as film or sheet material produced therefrom.

According to the present invention, there is provided an improved die for extruding a laminated tube of plastic. The die comprises a mandrel head and a die body associated therewith having adjacent separated surfaces defining an annulus terminating in a die mouth through which a laminated tube of plastic can be extruded. The separated surfaces of the mandrel head and die body are axially movable relative to each other to uniformly vary the thickness of the laminated plastic material in the annulus and thereby control to a large extent the thickness of the resulting laminated tubular product formed by the die. As part of the improved die a means is provided for feeding a first plastic material under pressure to a first walled distribution chamber from which it flows to an orifice and is formed into a first tubular ply which is delivered into contact with a second ply and then to the annulus. In addition, the die has means for feeding a second plastic material under pressure to a second walled distribution chamber and from there to an orifice which forms it into a second tubular ply and delivers it into contact with the inner side of the first tubular ply while both plies are still molten and before either ply comes in contact with air or other oxidizing material. The laminated tubular product is then extruded through the annulus and out the die mouth.

Another important feature of the die provided herewith is means to vary the orifice communicating with the first distribution chamber to change the first ply thickness. In addition, another important feature is means associated with the orifice communicating with the second distribution chamber to change the thickness of the second ply. In the most suitable embodiment of the invention, the die is provided with means for adjusting the thickness of each of the two plies independently and for adjusting the thickness of the laminated product as it is formed in the annulus before it is extruded from the die mouth.

The invention will now be described further in conjunction with the attached drawings in which:

FIG. 1 is an axial cross-sectional view of one die embodiment of the invention;

FIG. 1a is an enlarged cross-sectional view of the orifices forming the plies in the die of FIG. 1;

FIG. 2 is an axial cross-sectional view of another embodiment of the die of this invention;

FIG. 2a is an enlarged cross-sectional view of the orifices forming the plies in the die of FIG. 2; and FIG. 3 is a cross-sectional view taken along the line 3—3 of FIG. 2.

With reference to FIG. 1, there is shown a die body 10 generally cylindrical in shape but with an enlarged forward end 10. The die body 11 has an axial bore 9. The front end of die body 10 funnels outwardly to form an outwardly directed conical surface 13.

Positioned within die body 10 is mandrel 14 which slidably fits closely in bore 9. A main adjusting nut 15 is threaded onto thread 16 on the end of mandrel 14 so the die body 10 and mandrel can be adjusted with respect to one another. Once the adjustment has been made, flow of plastic material further holds the mandrel 14 in position relative to the die body 10. On the rear end of mandrel 14 is adapter block 17. On the side of the die body 10 is pipe 18 which communicates with hole 19. Through pipe 18 molten plastic is fed to conduit bore 20 running axially through mandrel 14 to near its forward end where it terminates 45. Four lateral holes 21 feed the molten plastic from bore 20 to plastic distribution chamber 22. Plastic distribution chamber 22 provides the molten fluid plastic material used in forming the inner ply of the laminated tubular product formed by means of the die.

The forward end 23 of mandrel 14 is of reduced diameter and is externally threaded 24 to threadably engage mandrel head 25. Mandrel head 25 has an axial hole 46 internally threaded for threading on the end 23 of mandrel 14. Holes 26 are provided in mandrel head 25 in order to use a spanner wrench for threadably adjusting die head 25 on the end of the mandrel. Die head 25 is externally conical in shape and has a surface 27 which is more or less equally spaced from surface 13 at the end of the die body.

Pipe 28 is threaded into receiving block 29 mounted on the side of the die body 10. Cooperating hole 31 is provided in the die body so that molten plastic material can be fed thereby into the walled distribution chamber 30 which runs completely around mandrel 14. The size of the walled distribution chamber 30 decreases in length as it projects around to the side of the mandrel opposite feed hole 31.

Running the entire length of mandrel 14 and located in bore 20 is pipe 32 which is secured in place at each end of the die body by hydraulic couplings 33 and 34. Air is fed into the pipe 32 at the end 35 and exits under pressure at the forward end of the die 36 thereby providing the necessary air pressure to maintain a bubble of laminated plastic material. Of course, if thickwalled tubular material is extruded no air need be supplied by pipe 32.

Near the forward end of mandrel 14, as shown in FIGS. 1 and 1a, is a concentric separator ring 42 positioned between plastic distribution chamber 30 and plastic distribution chamber 22. Ring 42 serves to form the two plys comprising the laminated product and in addition permits variation in the thickness of each of the plys through axial adjustment of the mandrel with respect to the die body 10 and with respect to mandrel head 25. Thus, by holding mandrel 14 fixed with respect to die body 10 and rotating mandrel head 25 the orifice 41 which forms the inner ply of the laminated tube can be varied in thickness. Simultaneously, there is achieved adjustment in thickness of the annulus 43 formed by the cooperating conical surface 27 of the mandrel head 25 and conical surface 13 of the die body end 11.

The thickness of the outer ply can be varied by threadably adjusting the size of the orifice 40 by axially moving mandrel 14 with respect to die body 10 by rotating nut 15. While this is done the annulus 43 can be held fixed in size or it can be threadably adjusted simultaneously by axially displacing mandrel head 25 with respect to die body 10. Accordingly, since die body 10, mandrel 14 and mandrel head 25 are all axially threadably adjustable with respect to one another it is possible to obtain gap adjustment of the annulus 43 while adjusting the gap of only one or both of the orifices 40 and 41. This permits great flexibility in producing laminated plastic tubular products since either the inner or outer ply can be increased or decreased in thickness with respect to the other ply and in addition the laminated product, immediately after it is formed in the die can be further subjected to guiding pressure to increase bonding strength as it passes through annulus 43 and out die mouth 44.

The described die develops a concentric flow of two different thermoplastic resinous or plastic materials, produces two distinct plastic plies and laminates them together while still in the molten state before the mating surfaces of each ply get a chance to contact air or other oxidizing materials which adversely affect bonding. The laminar resin flow remains discrete during formation of the plies and laminating of the product as well as subsequent passage of the laminate through the annulus and out the die mouth. A high quality bond is developed without intermixing of the two distinct plastic layers.

The novel construction of the die separates each of the plastic materials until the moment of contact so that different melt temperatures, pressures and viscosities do not cause problems during formation of the distinct plies and their subsequent lamination to one another. In addition to providing for adjustment of the ply thickness by means of adjustable orifices 40 and 41, obtained through movement of the die body relative to the mandrel and threaded union of the mandrel head 25 to the end 23 of the mandrel, it is possible to achieve further ply thickness adjustment by varying the speed of the extruders supplying the molten thermoplastic material to the die. Since the orifices 40 and 41 are located essentially at or adjacent to the point of lamination, pressure differences of each plastic material do not result in back flow. This novel construction permits high pressure differences between the plastics being laminated.

FIGS. 2, 2a and 3 of the drawings illustrate a second embodiment of the die provided by this invention. The die is made up in part of die body 50, generally cylindrical in shape, with a die body ring 51 positioned at the forward end thereof. A plurality of adjusting set screws 52 are located radially in nie body ring 51 to adjust bushing 53 as will be more fully explained hereinafter.

Positioned within circular bore 49 of die body 50 is diverter sleeve 54. Within diverter sleeve 54 is mandrel 56 which has an internal axial bore 57 for nearly its entire length. Molten plastic material is supplied to bore 57 by means of pipe 58 joined to connector 59 by means of coupling 60. Molten plastic material flows through hole 61 in connector 59 and then through aligned holes in diverter sleeve 54 and in mandrel wall. The molten plastic material then flows forward in bore 57 into side ports 62 which communicate with plastic distribution chamber 63.

The rear end 64 of mandrel 56 is externally threaded 69 to receive retaining nut 65 which is internally threaded. retaining collar 66 fits over and around nut 65 and is secured in place by set screws 67. Set screw 68 extends through die body 50 and through diverter sleeve 54 into contact with the mandrel to thereby position the diverter sleeve properly with respect to both the die body and the mandrel.

By means of pipe 70 joined by coupling 71 to connecter 72 plastic material in fluid condition is forced under pressure through hole 73 into walled plastic distribution chamber 74.

The rear end of mandrel 56 is closed by means of nut 80 threaded thereon into sealing position against O-ring 81 to provide a tight seal. Pipe 82 feeds air through the sealing nut 80 into the bore 83 in the mandrel. Bore 83 extends completely through the mandrel and meets with air hole 84 axially positioned in mandrel head 85.

The forward end of mandrel 56 is reduced in diameter and externally threaded 86 to receive mandrel head 85 in threadable adjustable engagement thereon. O-ring 87 positioned in a groove inside of mandrel head 85, facilitates obtaining a tight seal. Holes 88 in the end of mandrel head 85 provide spanner wrench means for threadably adjusting the mandrel head on the end of the mandrel to thereby vary orifice 89 and simultaneously the gap or clearance 90 between the tapered end surface 91 of mandrel head 85 and complementary surface 92 located in bushing 53.

One plastic from walled distribution chamber 63 is forced around the separating projection 93 and out orifice 89 to thereby form the inner ply. Another liquid plastic is forced through walled distribution chamber 74 and through annular orifice 94 to form the outer ply. The two liquid plastic plys meet in the area 95 and are brought together into intimate contact with one another while still molten and in the absence of any oxidizing material such as air which would adversely affect the bonding capacity of the plastic plies. The laminated product while still molten moves forward in the die through annulus 90 and out die mouth 96 to form laminated product 97. The laminated tubular product 97 is maintained in shape by means of air supplied under pressure out air orifice 84.

The set screws 52 move bushing 53 radially with respect to the mandrel and thereby permit adjustment to obtain uniform external ply thickness as well as a laminated product of uniform thickness. Orifice 94 is essentially fixed in thickness but nevertheless the thickness of the outer ply can be varied in thickness by increasing or decreasing the rate of flow of the plastic supplied to distribution chamber 74. Orifice 89 is adjustable in clearance by threadably moving mandrel head 85 with respect to mandrel 56.

The described dies can be used for laminating the same thermoplastic materials or different plastics. A particularly useful product is obtained using an inner ply of low density polyethylene and an outer ply of nylon.

The foregoing detailed description has been given for clearness of understanding only, and no unnecessary limitations should be understood therefrom as modifications will be obvious to those skilled in the art.

What is claimed is:

1. A die for extruding a laminated tube of plastic comprising:
   a mandrel head and a die body associated therewith having adjacent separated surfaces defining an annulus terminating in a die mouth through which a laminated tube of plastic can be extruded, said separated surfaces being axially movable relative to each other to uniformly vary the thickness of the annulus;
   means to feed a plastic material under pressure to a first walled distribution chamber;
   an orifice communicating with the first distribution chamber for forming the plastic material into a first tubular ply and delivering it to the annulus;
   means to feed a plastic material under pressure to a second walled distribution chamber; and
   an orifice communicating with the second distribution chamber for forming the plastic material into a second tubular ply and delivering it to the annulus into contact with the inner side of the first tubular ply.

2. A die according to claim 1 having means to vary the orifice communicating with the first distribution chamber to change the first ply thickness.

3. A die according to claim 1 having means to vary the orifice communicating with the second distribution chamber to change the second ply thickness.

4. A die for extruding a laminated tube of plastic comprising:
   a mandrel head and a die body associated therewith having adjacent separated surfaces defining an annulus terminating in a die mouth through which a laminated tube of plastic can be extruded, said separated surfaces being axially movable relative to each other to uniformly vary the thickness of the annulus;
   means to feed a plastic material under pressure to a first walled distribution chamber;
   a variable orifice communicating with the first distribution chamber for forming the plastic material into a first tubular ply and delivering it to the annulus;
   means to feed a plastic material under pressure to a second walled distribution chamber; and
   a variable orifice communicating with the second distribution chamber for forming the plastic material into a second tubular ply and delivering it to the annulus into contact with the inner side of the first tubular ply.

5. A die for extruding a laminated tube of plastic comprising:
   a mandrel head and a die body associated therewith having adjacent separated surfaces defining an annulus terminating in a die mouth through which a laminated tube of plastic can be extruded, said separated surfaces being axially movable relative to each other to uniformly vary the thickness of the annulus and the die mouth;
   means to feed a plastic material under pressure to a first walled distribution chamber;
   means to feed a plastic material under pressure to a second walled distribution chamber;
   a separator ring axially movable positioned between the first and second distribution chambers and defining;
   a variable orifice communicating with the first distribution chamber for forming the plastic material into a first tubular ply and delivering it to the annulus; and
   a variable orifice communicating with the second distribution chamber for forming the plastic material into a second tubular ply and delivering it to the annulus into contact with the inner side of the first tubular ply.

6. A die for extruding a laminated tube of plastic comprising:
   a mandrel head and a die body associated therewith having adjacent separated surfaces defining an annulus and terminating in a die mouth through which a laminated tube of plastic can be extruded;
   means to feed a plastic material under pressure to a first walled distribution chamber;
   means to feed a plastic material under pressure to a second walled distribution chamber;
   a separator ring axially movable positioned between the first and second distribution chambers and defining;
   a variable orifice communicating with the first distribution chamber for forming the plastic material into a first tubular ply and delivering it to the annulus; and
   a variable orifice communicating with the second distribution chamber for forming the plastic material into a second tubular ply and delivering it to the annulus into contact with the inner side of the first tubular ply.

7. A die according to claim 6 in which axial movement of the separator ring simultaneously increases the size of one of the orifices and decreases the size of the other orifice.

8. A die for extruding a laminated tube of plastic comprising:
   a longitudinal mandrel;
   a tapered mandrel head located axially on the end of the mandrel;
   a die body surrounding the mandrel and having an internal tapered surface surrounding the tapered mandrel head in spaced apart relation thereby defining an annulus terminating in a die mouth through which a laminated tube of plastic can be extruded;
   a first plastic distribution chamber defined by the mandrel and the die body having an orifice for forming a first tubular ply of plastic material fed thereto and delivering it to the annulus;
   a second plastic distribution chamber defined by the mandrel and mandrel head having an orifice for forming a second tubular ply of plastic material fed thereto and delivering it to the annulus into contact with the first tubular ply;
   said tapered mandrel head being axially movable relative to the internal tapered surface of the die body to vary the size of the annulus and the die mouth opening.

9. A die according to claim 8 in which the mandrel head is axially movable relative to the mandrel and the die body.

10. A die according to claim 8 having means to vary the orifice communicating with the first distribution chamber to change the first ply thickness.

11. A die according to claim 8 having means to vary the orifice communicating with the second ply thickness.

References Cited

UNITED STATES PATENTS

| | | | |
|---|---|---|---|
| 830,201 | 9/1906 | Blondel | 18—13 P |
| 2,736,921 | 3/1956 | Mulbarger et al. | 18—14 PUX |
| 2,957,201 | 10/1960 | Fields et al. | 18—14 PX |
| 3,102,303 | 9/1963 | Lainson | 18—14 P |
| 3,218,971 | 11/1965 | Rowland | 18—13 P |
| 3,223,761 | 12/1965 | Raley | 18—13 PX |
| 3,315,306 | 4/1967 | Ladner et al. | 18—13 P |
| 3,419,938 | 1/1969 | Sonia et al. | 18—14 P |
| 3,447,204 | 6/1969 | Lainson | 18—13 PX |

J. SPENCER OVERHOLSER, Primary Examiner

PO-1050
(5/69)

UNITED STATES PATENT OFFICE
CERTIFICATE OF CORRECTION

Patent No. 3,546,743            Dated   December 15, 1970

Inventor(s) Donald Jacob Roth

It is certified that error appears in the above-identified patent and that said Letters Patent are hereby corrected as shown below:

Col. 1, lines 15 and 16, change "containing" to --contacting--. Col. 2, line 58, change end 10." to --end 11.-- and "body 11" to --body 10--. Col. 4, line 9, change "thickness" to --thicknesses--; line 26, change "nie" to --die--; line 42, change "retaining" to --Retaining--.

SIGNED AND
SEALED (SEAL)
Attest:

Edward M. Fletcher, Jr.
Attesting Officer

WILLIAM E. SCHUYLER, JR.
Commissioner of Patents